May 11, 1926.
W. T. HUNT
BRAKE FOR AUTOMOTIVE VEHICLES
Filed Jan. 17, 1924
1,584,297
2 Sheets-Sheet 1
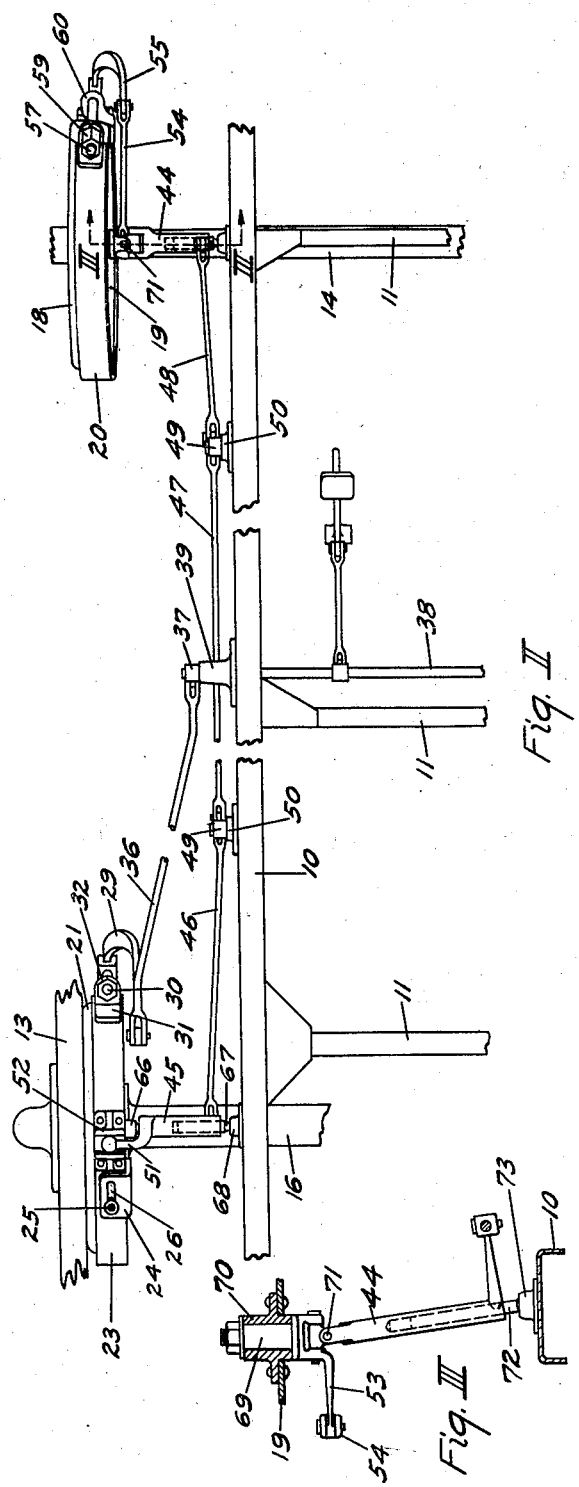
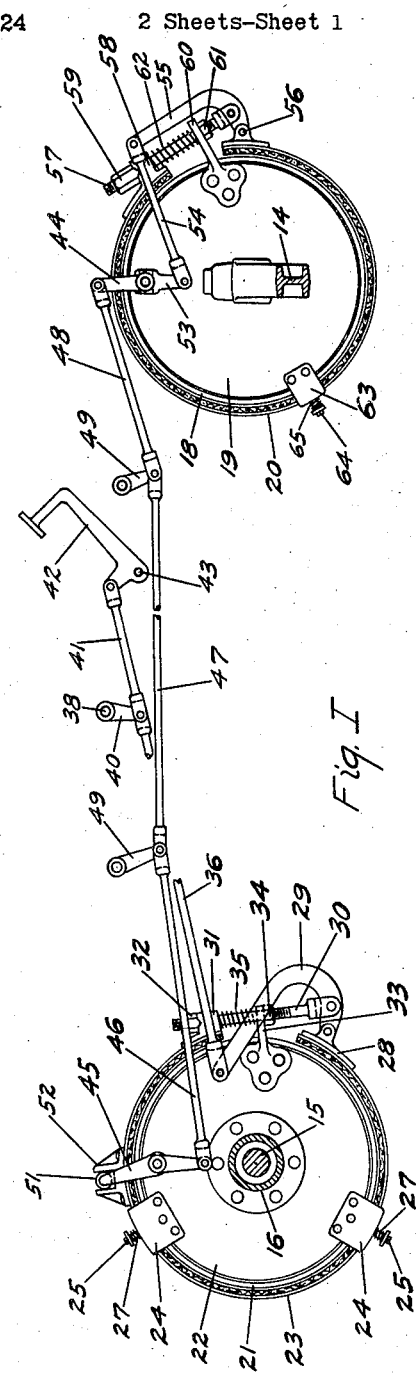
INVENTOR.
Warren T. Hunt
BY
ATTORNEY.

May 11, 1926.
W. T. HUNT
1,584,297
BRAKE FOR AUTOMOTIVE VEHICLES
Filed Jan. 17, 1924
2 Sheets-Sheet 2
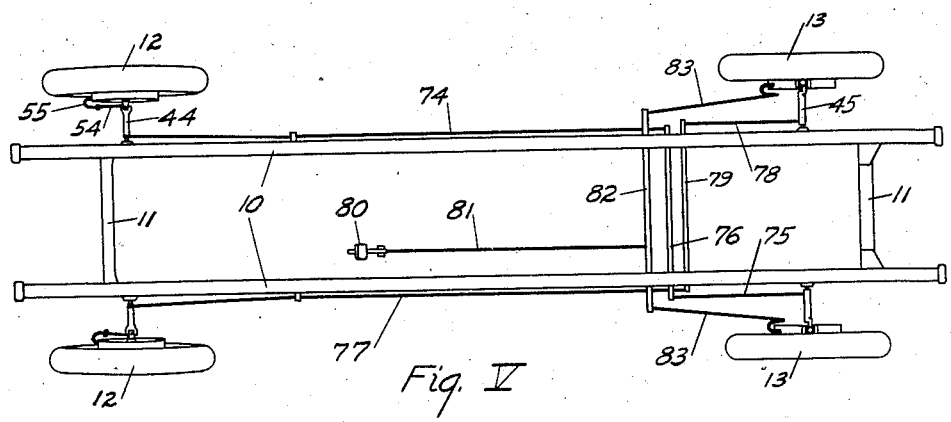
Fig. V
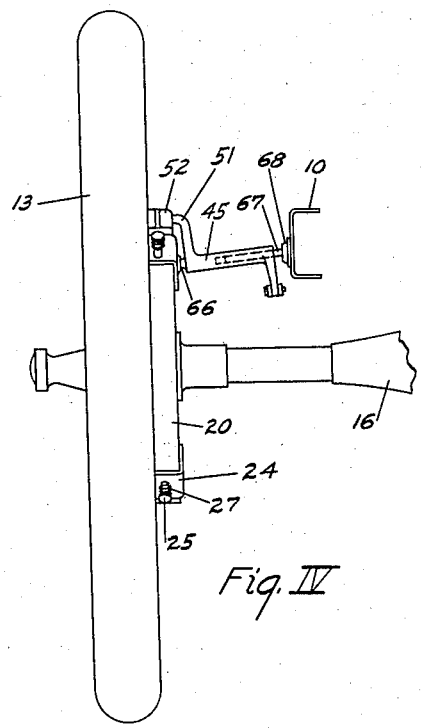
Fig. IV
INVENTOR.
Warren T. Hunt
BY Solon J. Boughton
ATTORNEY.

Patented May 11, 1926.

1,584,297

UNITED STATES PATENT OFFICE.

WARREN T. HUNT, OF TOLEDO, OHIO, ASSIGNOR TO THE WILLYS-OVERLAND COMPANY, OF TOLEDO, OHIO, A CORPORATION OF OHIO.

BRAKE FOR AUTOMOTIVE VEHICLES.

Application filed January 17, 1924. Serial No. 686,807.

This invention relates to brakes for automotive vehicles and broadly contemplates the application of one or more secondary braking devices by means of a force or forces which are the result of the application of another or plurality of primary braking devices, where the latter act to check the momentum of the vehicle, or of some driven part thereof, and the checking of the momentum serves to displace a relatively movable part connected up with the secondary braking devices in a manner to effect application of the same.

The invention further has for its object, to provide a compensating system of brakes for the front and rear wheels of the vehicle, constructed so that the torque of a relatively movable part of the vehicle, resulting through the application of the controlling set of brakes, will effect the application of the other set, either at the same, or at a greater or less pressure than that of the controlling set, as may be desired.

Another object of the invention is to provide both sets of wheels with interconnected brakes, the brakes for one set being manually controlled and adapted upon application to have a limited movement, which movement is utilized to effect the application of the other set of brakes, either at the same or at a different pressure from that of the controlling set, and preferably subsequent to the application of the controlling set.

Another object of the invention is to provide an interconnected compensating system of front and rear wheel brakes constructed so that one set of brakes will effect application of the other in a manner to prevent the latter from becoming locked under any and all conditions of service.

Another object of the invention is to provide a system of front and rear wheel brakes including brake bands and interconnecting links and levers between the same, the rear bands being manually actuated, and being mounted for a limited circumferential movement upon contacting with the brake drums, whereby they are adapted, through said links and levers, to effect operation of the front bands to apply the same at any suitable pressure, which may be varied as desired by changing the proportions of the levers.

Other objects will appear from the description to follow, covering certain embodiments of the invention, which, for the purposes of the present application, I have illustrated in the accompanying drawings, in which:

Figure I is a sectional elevation in somewhat diagrammatic form, illustrating one embodiment of the invention.

Fig. II is a fragmentary plan illustrating diagrammatically, the application of the brakes shown in Fig. I to the running gear of a motor vehicle.

Fig. III is an enlarged transverse section taken on line III—III of Fig. II.

Fig. IV is an end elevation showing one of the rear wheels and disclosing the manner of mounting the brake operating lever between the wheel and vehicle frame, and Fig. V is a plan view of the running gear illustrating diagrammatically, a modified form of the invention involving a method of connecting each rear wheel brake with the front wheel brake on the opposite side of the frame.

The principles embodied in the compensating brake mechanism disclosed in the drawings, are applicable to different types of motor vehicles, and may be embodied in various forms of mechanism under the control of the driver. The particular form of construction shown, is by way of illustration, and may be varied as desired to suit different conditions arising from time to time.

The construction to which the brake is shown applied, embodies a portion of the running gear of the vehicle, including the usual side frame and cross-tie members 10 and 11 respectively, and the front and rear wheels 12 and 13, together with the front and rear axles 14 and 15 and the rear axle housing 16, and other necessary parts, not shown. The front wheels are provided with brake drums 18, and the spindles of the front axles with suitable closures 19 for the drums, preferably in the form of discs rigid on the spindles and adapted to support the brake bands 20 and other parts of the brake to be described hereinafter.

The rear wheels 13 are provided with brake drums 21, and the rear axle housing 16 with suitable discs or closures 22 for the drums, which are rigidly secured to the housing by any suitable means. Brake bands 23 are adapted to substantially surround the drums, and are carried by the angular brackets 24 rigidly secured to the closures 22 in any suitable manner. The brackets are provided with outer portions which overlie the brake band, the latter being provided with bolts or studs 25 which are extended through slots 26 in the brackets. The bolts are provided with springs 27 adapted to normally hold the bands out of engagement with the drums. One end of the band 23 is provided with a bracket 28 to which is pivoted a bent lever 29 pivotally supporting an upstanding rod 30 having its upper end extended through a bracket 31 on the other end of the band and secured by a nut 32, as shown in Fig. I. The rod is also extended through an arm 33 rigid on the supporting disc 22. A nut 34 is threaded upon the rod in engagement with the lower side of the arm, while a spring 35 surrounds the rod between the arm and the bracket 31 of the brake band. The spring 35 serves to assist in normally holding the band out of engagement with the drum, and by reason of the adjustable nut 34, the band may be shifted circumferentially about the drum to bring it to the desired position of adjustment.

Connected with the upper end of the lever 29 is an operating rod or link 36, the forward end of which connects with an arm 37 rigid on a cross-rod 38 journaled in brackets 39 on the side frame members 10. The cross-rod is provided at a convenient point between the side frame members with a downwardly extending arm 40, to which is connected a link 41 having its forward end connected with a foot lever 42 pivoted at 43 to any suitable support (not shown). The lever may be provided with a light spring (not shown), adapted to hold it in the desired position. From the construction just described, it will be seen that the rear brakes can be applied by the driver, through depression of the foot pedal in the usual manner.

The application of the front brakes is made dependent upon the operation of the rear brakes, preferably through a system of links and levers controlled by a limited circumferential movement of the rear brake bands, as will be seen from the description to follow. When the band 23 is made to grip the drum 21 through depression of the foot pedal, the torque or rotatory force of the drum will impart a limited movement to the band circumferentially about its axis in a clockwise direction, as viewed in Fig. I, such movement being permitted by reason of the slots 26 in the brackets 24, the latter serving to support the brake band in proper position upon the drum.

The movement of the band in this manner is transferred to the front wheels by reason of the front and rear crank levers 44 and 45, and the inter-connecting links or operating rods 46, 47 and 48, which are swingingly mounted upon the frame by the depending links 49 pivoted upon the brackets 50, which are suitably connected with the side frame members 10. The crank lever 45 is provided with an upwardly and outwardly extending arm 51, freely engaging a recessed bracket 52 on the band, by which the lever is operated when the band is moved circumferentially about the drum through frictional contact therewith. Such a movement exerts a pull on the rods 46, 47 and 48 to actuate the front crank lever 44, from the lower arm 53 of which extends a connection 54 to the top of the front brake lever 55, which is pivoted to the brake band 20, as shown at 56. The lever 55 carries a pivotally mounted upstanding rod 57 extended through a bracket 58 upon the opposite end of the band, and secured by a nut 59, as shown in Fig. I. An arm 60 is rigidly secured to the brake disc 19, and an adjustable nut 61 on the rod serves as a means for regulating the position of the band with respect to the drum, while the spring 62 assists in normally holding the band out of engagement with the drum. The band in this case is preferably not made to rotate with the drum, being supported at a point intermediate its ends, by a bracket 63 secured to the disc 19, as shown in Fig. I, and adapted to receive a bolt or stud 64 fixed to the band and extending through the bracket, with a spring 65 serving to yieldingly hold the band out of contact with the drum, the bolt serving as an anchor for the band.

Thus, it will be seen that when the front crank lever 44 is actuated by the movement of the rear brake band, the upper end of the lever 55 will be moved outwardly to clamp the band 20 upon the drum 18. Since the band 20 is not adapted to rotate about the axis of the drum, it will, as soon as it is moved into contact with the drum, act through its connections with the rear brake band as a restraining or equalizing means to prevent undue circumferential movement of the latter, thus affording a compensating arrangement between the front and rear brakes.

The crank lever 45 is flexibly supported or pivotally connected at its outer end to the brake disc 22 by any suitable means, such as the ball and socket connection shown at 66 in Figs. II and IV, and is supported at its inner end by a rod 67 in sliding engagement with the lever, the rod also having a ball and socket connection, preferably with the side frame member 10, as indicated at 68. This construction affords means for properly supporting the lever, and permits it to be successfully operated at all times, regardless of any relative movement that may occur between the frame and rear axle construction, or between the frame and brake disc, which is rigid with the rear axle housing.

The lower arm 53 of the front crank lever 44 is provided with an extension 69 pivotally mounted in a bearing 70 secured to the brake disc 19, as shown in Fig. III, and the horizontal portion of the lever is connected with the arm 53 by a universal joint, as shown at 71. The horizontal portion is supported at its inner end by a rod 72 having sliding engagement therewith, the rod having a ball and socket connection with the frame, as indicated at 73. This construction also permits relative movement between the frame and front axle without interfering with the operation of the front wheel brakes.

In the modification shown diagrammatically in Fig. V, the left hand rear wheel brake is connected with the right hand front wheel brake by the long and short connections 74 and 75, through connection with the cross-rod 76, while the right hand rear brake is connected with the left hand front brake through the long and short connections 77 and 78, together with the cross-rod 79. This arrangement will tend to equalize the braking power on opposite sides of the vehicle, irrespective of the adjustment of the two rear brakes relative to each other. In this case, the rear brakes are applied through depression of the pedal 80 which actuates the connection 81 to operate the cross-rod 82, which in turn actuates the connections 83 directly connected with the rear brakes, preferably as disclosed in Figs. I and II. In the modification, the front and rear brakes proper are preferably the same as disclosed in Figs. I and II, it being merely the arrangement of the operating connections, which differs from that indicated in the preferred form of the invention.

The present brake design, as stated above, is such that the torque of the brakes on the wheels of one axle is relied on to effect application of the brakes on the wheels of the other axle. In either case, the controlling set of bands will be free to move circumferentially, preferably until restricted by the reaction of the opposite set of brakes. With the present construction, the front wheel brakes are operated only by the rear wheel braking torque, and as this torque is limited by the frictional resistance of the tire on the road, the maximum torque available can be readily calculated and the front wheel brake operating levers designed so that the maximum torque is less than the force necessary to lock the front wheels. The design may therefore be such that the locking of the front wheels is made impossible. Should the rear wheels become locked, this will result in preventing an increase in the pressure on the front brakes, since no additional pressure will be applied thereon after the rear drums stop rotating.

The problem, given the broad principles of the invention, is one which can be worked out in various ways by those skilled in the art, either through a system of links and levers as disclosed, or by pressure controlled devices, where the operation is effected through compression of a liquid, or in any way desired, without departing from the spirit of the invention as expressed in the claims.

I claim as my invention:

1. In a brake mechanism for automobiles, the combination with a running gear including a frame and front and rear wheels and axles, of separate brakes and brake drums for each of the front and rear wheels, external brake bands for each of the rear wheel drums, discs fixed to the rear axle adjacent said drums slotted brackets attached to the disks for supporting the brake bands and allowing a limited circumferential movement thereof, and means whereby the circumferential movement of the rear brake bands actuates the front wheel brakes when the rear brakes are applied.

2. In a brake mechanism for automobiles the combination with a running gear including a frame and front and rear wheels and axles of separate brakes and brake drums for each of the front and rear wheels, external brake bands on each of the rear wheel drums, disks fixed to the rear axle adjacent said drums, dotted brackets attached to the disks for supporting the brake bands and allowing a limited circumferential movement thereof, recessed brackets rigidly mounted on the brake bands, crank levers pivotally mounted on said disks and having portions engaging said recessed brackets, said levers being actuated by circumferential movement of said brake bands and means for causing said levers to apply the front wheel brakes.

3. In a brake mechanism for automobiles the combination with a running gear including a frame and front and rear wheels and axles, of separate brake drums for each of the rear wheels, external brake bands for said drums, disks fixed to said rear axle for supporting said bands, means for permitting a limited circumferential movement of said brake bands, levers pivotally mounted on said disks and engaging said brake bands so as to be actuated by a circumferential movement thereof, brakes for said front wheels, and means whereby said levers are adapted to actuate said front wheel brakes.

4. In a brake mechanism for automobiles, the combination with a running gear including a frame and front and rear wheels and axles, of separate brake drums for each of the rear wheels, external brake bands for said drums, disks fixed to said rear axles for supporting said bands, means for permitting a limited circumferential movement of said bands, levers pivotally mounted on said disks and supported by a ball and socket connection to said frame, recessed brackets on said brake bands for engaging said levers, brakes on the front wheels and means whereby a circumferential movement of said brake bands and recessed brackets causes said levers to actuate the front wheel brakes.

5. In a brake mechanism for automobiles the combination of a running gear including a frame and front and rear wheels and axles, of separate brake drums for each of the rear wheels, an external brake band for each rear drum, disks fixed to said rear axle, slotted brackets fixed to said disks for supporting said brake bands radially and permitting a limited circumferential movement thereof, recessed brackets secured to said brake bands, cranklevers pivotally mounted on said disks and having ball portions engaged by said recessed brackets, brakes for the front wheels and means whereby a circumferential movement of said brake bands causes said levers to actuate the front wheel brakes.

In testimony whereof, I affix my signature.

WARREN T. HUNT.